United States Patent
Jin et al.

(10) Patent No.: US 12,411,396 B2
(45) Date of Patent: Sep. 9, 2025

(54) ELECTRONIC DEVICE, CONTROL METHOD AND CONTROL APPARATUS THEREOF, AND TERMINAL DEVICE

(71) Applicant: VIVO MOBILE COMMUNICATION CO., LTD., Guangdong (CN)

(72) Inventors: Ming Jin, Guangdong (CN); Dongcun Cheng, Guangdong (CN); Wei Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 211 days.

(21) Appl. No.: 18/335,421

(22) Filed: Jun. 15, 2023

(65) Prior Publication Data
US 2023/0324773 A1 Oct. 12, 2023

Related U.S. Application Data

(63) Continuation of application No. PCT/CN2021/139006, filed on Dec. 17, 2021.

(30) Foreign Application Priority Data

Dec. 21, 2020 (CN) .......................... 202011517166.2

(51) Int. Cl.
G03B 17/56 (2021.01)
(52) U.S. Cl.
CPC .................. G03B 17/561 (2013.01)
(58) Field of Classification Search
CPC ...... G03B 17/56; G03B 17/561; H04N 23/57; F16M 11/38; F16M 2200/068; F16M 11/24
See application file for complete search history.

(56) References Cited

U.S. PATENT DOCUMENTS

| 2007/0279481 A1 | 12/2007 | Chambers et al. |
| 2012/0218635 A1 | 8/2012 | Suzuka |
| 2012/0316685 A1 | 12/2012 | Pettersson |

(Continued)

FOREIGN PATENT DOCUMENTS

| CN | 104539830 A | 4/2015 |
| CN | 106143937 A | 11/2016 |

(Continued)

Primary Examiner — Stephanie E Bloss
Assistant Examiner — Fang-Chi Chang
(74) Attorney, Agent, or Firm — Price Heneveld LLP

(57) ABSTRACT

An electronic device is disclosed. A first driving mechanism is provided in an inner chamber, which is capable of driving a movable module to retract into or extend out of a housing through a through hole. The movable module includes a first bracket, a second driving mechanism, a second bracket rotatably disposed on the first bracket, a functional module including an anti-shake micro-cloud gimbal and a camera movably disposed on the anti-shake micro-cloud gimbal, and a third driving mechanism. The third driving mechanism is disposed on the second bracket, connected to the functional module, and drives the functional module to rotate around a first axis. The second driving mechanism is disposed on the first bracket, and drives the second bracket to rotate around a second axis. The functional module is rotatably disposed on the second bracket, and is capable of rotating with the second bracket.

16 Claims, 3 Drawing Sheets

(56) References Cited

U.S. PATENT DOCUMENTS

| | | | |
|---|---|---|---|
| 2017/0075129 A1 | 3/2017 | Hsu et al. | |
| 2019/0215430 A1* | 7/2019 | Appel | ............... F16M 11/123 |
| 2020/0068128 A1 | 2/2020 | Honjo | |
| 2020/0177715 A1 | 6/2020 | Chen | |
| 2022/0407997 A1 | 12/2022 | Zhang et al. | |

FOREIGN PATENT DOCUMENTS

| | | |
|---|---|---|
| CN | 109547600 A | 3/2019 |
| CN | 110233919 A | 9/2019 |
| CN | 110673656 A | 1/2020 |
| CN | 209913870 U | 1/2020 |
| CN | 110784650 A | 2/2020 |
| CN | 111212209 A | 5/2020 |
| CN | 211152050 U | 7/2020 |
| CN | 111917966 A | 11/2020 |
| CN | 212029014 U | 11/2020 |
| CN | 112637494 A | 4/2021 |
| JP | 2008514157 A | 5/2008 |
| JP | 3207632 U | 11/2016 |

* cited by examiner

ELECTRONIC DEVICE, CONTROL METHOD AND CONTROL APPARATUS THEREOF, AND TERMINAL DEVICE

This application is a continuation application of PCT International Application No. PCT/CN2021/139006 filed on Dec. 17, 2021, which claims priority to Chinese Patent Application No. 202011517166.2, filed with the China National Intellectual Property Administration on Dec. 21, 2020 and entitled "ELECTRONIC DEVICE, CONTROL METHOD AND CONTROL APPARATUS THEREOF, AND TERMINAL DEVICE", which are incorporated herein by reference in their entireties.

TECHNICAL FIELD

This application relates to the field of shooting technology for electronic devices, and in particular, to an electronic device, a control method and control apparatus thereof, and a terminal device.

BACKGROUND

With the rapid development of electronic devices, users propose increasingly high requirements for shooting functions of electronic devices. Specifically, users propose increasingly high requirements for clarity of shots, field of view for shooting, and the like.

In the related art, camera modules are all fixedly provided in electronic devices. When a user is taking photos with an electronic device, it is difficult for the user who holds the electronic device by hand to maintain a stationary shooting posture, so the user tends to shake, resulting in blurry images shot by the electronic device. This leads to poor anti-shake effects of the electronic device in the related art.

SUMMARY

According to a first aspect, this application discloses an electronic device including a housing, a first driving mechanism, and a movable module, where the housing has an inner chamber and a through hole communicating with the inner chamber, the first driving mechanism is disposed in the inner chamber, and the first driving mechanism is connected to the movable module and capable of driving the movable module to retract through the through hole into the housing or at least partially extend out of the housing; where
the movable module includes a first bracket, a second driving mechanism, a second bracket, a functional module, and a third driving mechanism, where the functional module is rotatably disposed on the second bracket, the third driving mechanism is disposed on the second bracket, the third driving mechanism is connected to the functional module and drives the functional module to rotate around a first axis, the second bracket is rotatably disposed on the first bracket, the second driving mechanism is disposed on the first bracket, the second driving mechanism drives the second bracket to rotate around a second axis, the functional module is capable of rotating with the second bracket, and the first axis and the second axis intersect or lie on different planes;
the functional module includes an anti-shake micro-cloud gimbal and a camera, the camera being movably disposed on the anti-shake micro-cloud gimbal; and
the electronic device has a first anti-shake state and a second anti-shake state, where in a case that the electronic device is in the first anti-shake state, at least one of the second driving mechanism and the third driving mechanism drives the functional module to rotate; and in a case that the electronic device is in the second anti-shake state, the camera is capable of rotating relative to the anti-shake micro-cloud gimbal.

According to a second aspect, this application discloses a control method of electronic device, where the electronic device is the electronic device according to the first aspect, and the control method includes:
receiving control information;
in a case that the control information is first control information, controlling at least one of the second driving mechanism and the third driving mechanism to drive the functional module to rotate; and
in a case that the control information is second control information, controlling the camera to rotate relative to the anti-shake micro-cloud gimbal.

According to a third aspect, this application discloses a control apparatus of electronic device, where the electronic device is the electronic device according to the first aspect, and the control apparatus includes:
a receiving module configured to receive control information;
a first control module configured to, in a case that the control information is first control information, control at least one of the second driving mechanism and the third driving mechanism to drive the functional module to rotate; and
a second control module configured to, in a case that the control information is second control information, control the camera to rotate relative to the anti-shake micro-cloud gimbal.

According to a fourth aspect, this application discloses a terminal device including a processor, a memory, and a program or instructions stored in the memory and capable of running on the processor, where when the program or instructions are executed by the processor, the steps of the control method according to the second aspect are implemented.

According to a fifth aspect, this application discloses a readable storage medium, where the readable storage medium stores a program or instructions, and when the program or instructions are executed by a processor, the steps of the control method according to the second aspect are implemented.

BRIEF DESCRIPTION OF DRAWINGS

To describe the technical solutions in the embodiments of this application or in the background more clearly, the following briefly describes the accompanying drawings required for describing the embodiments or the background. Apparently, persons of ordinary skill in the art may still derive other drawings from these accompanying drawings without creative efforts.

Reference signs in the accompanying drawings are described as follows:
100. housing; 110. through hole; 120. rotating shaft;
200. first driving mechanism;

300. movable module; 310. first bracket; 320. second driving mechanism; 330. second bracket; 340. functional module; 341. anti-shake micro-cloud gimbal; 342. camera; 343. fill light assembly; 350. third driving mechanism;
400. base;
500. elastic structural member;
600. guide member;
700. sleeve member;
800. first circuit board;
900. second circuit board;
1200. terminal device; 1201. radio frequency unit; 1202. network module; 1203. audio output unit; 1204. input unit; 12041. graphics processing unit; 12042. microphone; 1205 sensor; 1206. display unit; 12061 display panel; 1207. user input unit; 12071. touch panel; 12072. other input devices; 1208. interface unit; 1209. memory; 1210. processor; and 1211. power supply.

DESCRIPTION OF EMBODIMENTS

To make the objectives, technical solutions, and advantages of this application clearer, the following clearly describes the technical solutions of this application with reference to specific embodiments of this application and corresponding accompanying drawings. Obviously, the described embodiments are merely some but not all of the embodiments of this application. All other embodiments obtained by persons of ordinary skill in the art based on the embodiments of this application without creative efforts fall within the protection scope of this application.

The technical solutions disclosed in the embodiments of this application are described in detail below with reference to the accompanying drawings.

Figure 1:
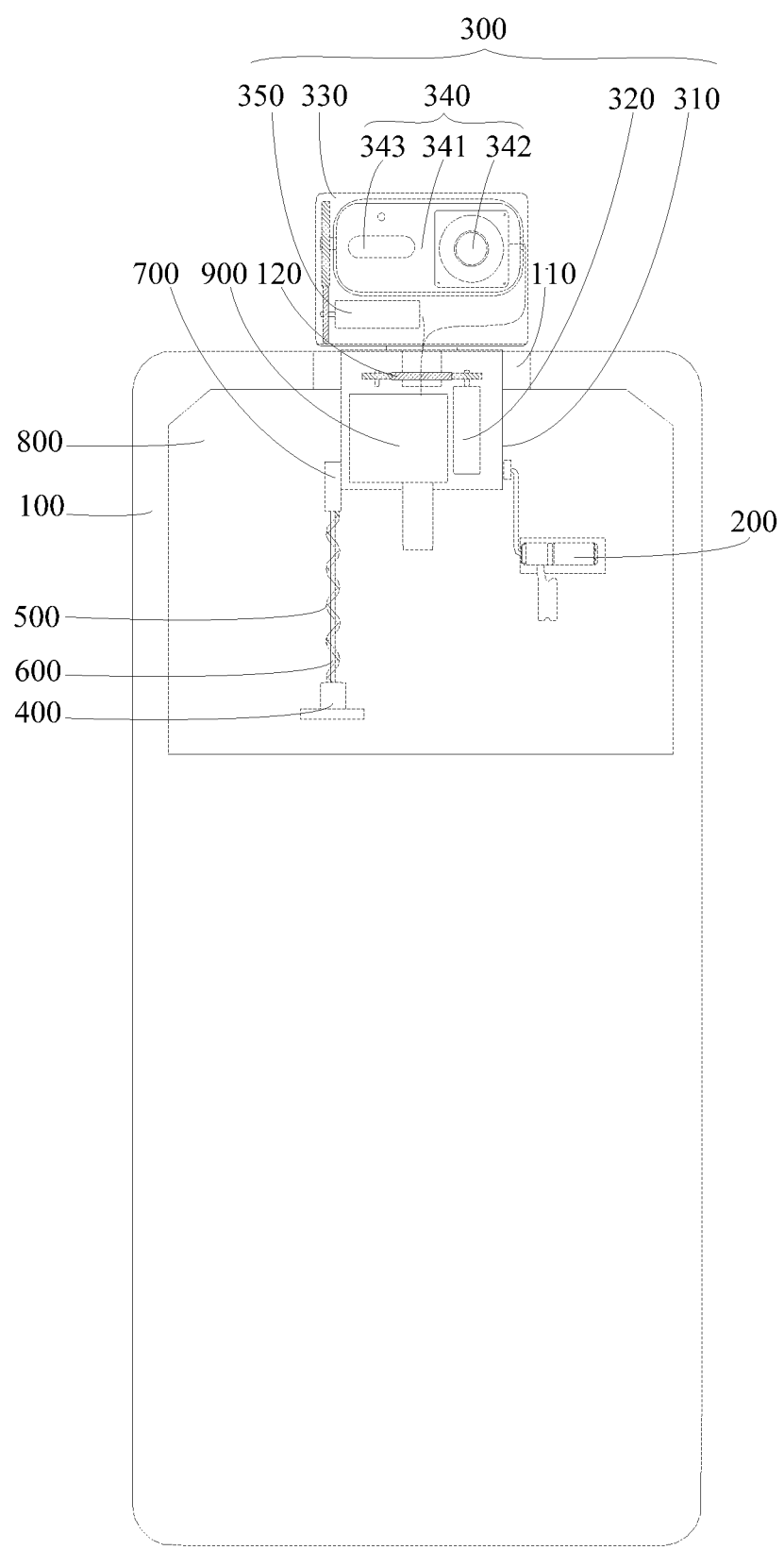
FIG. 1 is a schematic structural diagram of an electronic device with a movable module extending out of a housing according to an embodiment of this application.
Figure 2:
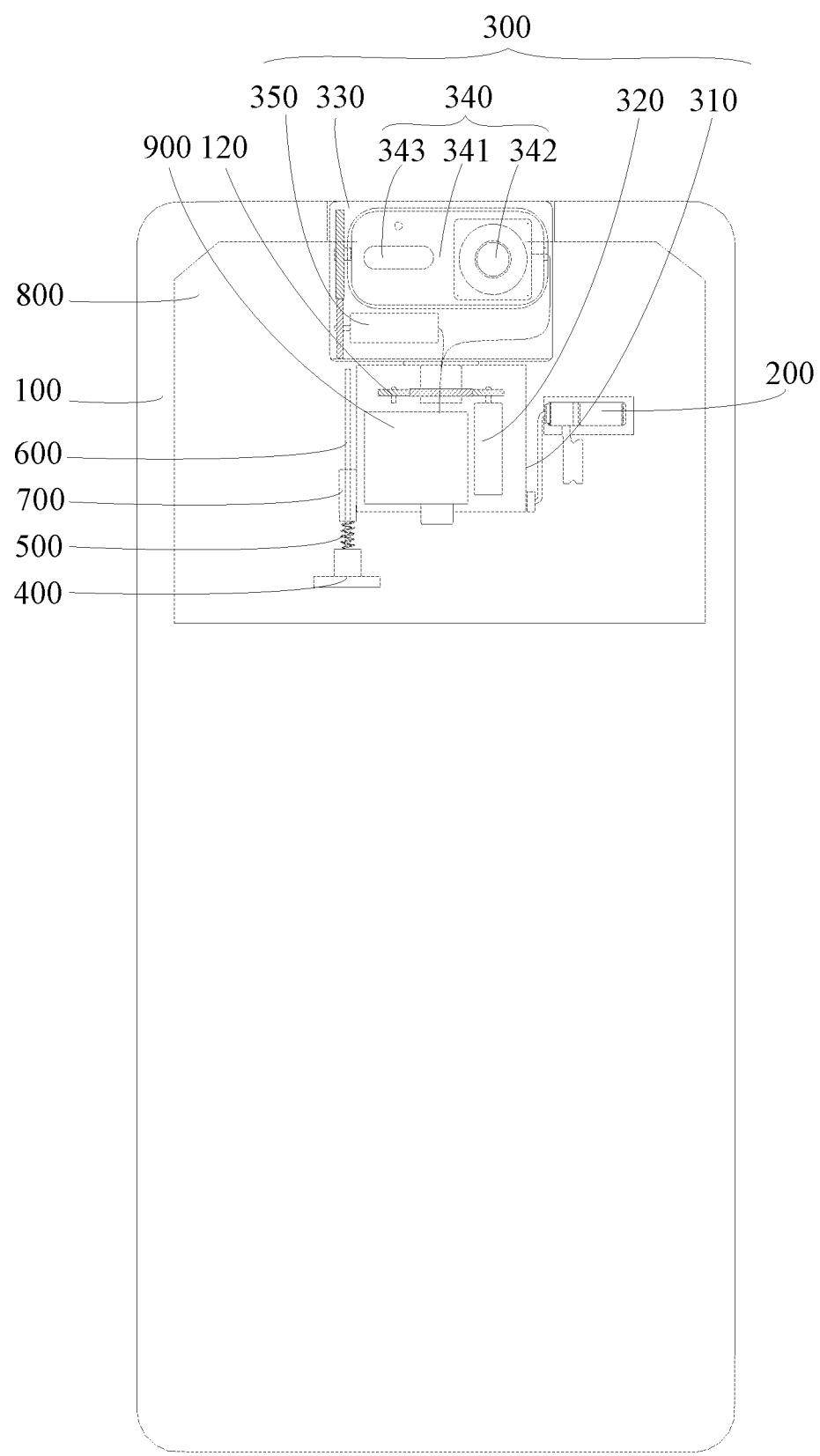
FIG. 2 is a schematic structural diagram of an electronic device with a movable module retracting into a housing according to an embodiment of this application.

Referring to FIG. 1 and FIG. 2, an embodiment of this application discloses an electronic device. The disclosed electronic device includes a housing 100, a first driving mechanism 200, and a movable module 300.

The housing 100 provides a foundation for mounting the first driving mechanism 200 and the movable module 300 and also provides protection for the first driving mechanism 200 and the movable module 300. The housing 100 has an inner chamber and a through hole 110 communicating with the inner chamber. The first driving mechanism 200 is disposed in the inner chamber so that the housing 100 can provide protection for the first driving mechanism 200.

The first driving mechanism 200 is connected to the movable module 300 and capable of driving the movable module 300 to retract through the through hole 110 into the housing 100 (that is, retracting into the inner chamber of the housing 100) or to at least partially extend out of the housing 100. In this case, the movable module 300 can be driven by the first driving mechanism 200 to at least partially extend out of the housing 100 to work. After the work is completed, the movable module 300 can be driven by the first driving mechanism 200 to retract into the housing 100 for accommodation in the housing 100.

The movable module 300 includes a first bracket 310, a second driving mechanism 320, a second bracket 330, a functional module 340, and a third driving mechanism 350. The functional module 340 is rotatably disposed on the second bracket 330, and the third driving mechanism 350 is disposed on the second bracket 330, such that the second bracket 330 provides mounting positions for the third driving mechanism 350 and the functional module 340. Specifically, the third driving mechanism 350 may be fastened on the second bracket 330 through welding, bonding, connection using connectors (for example, screw connectors), and the like. The functional module 340 may be disposed on the second bracket 330 through rotatable engagement in a shaft hole or bearing connection.

The third driving mechanism 350 is connected to the functional module 340 and drives the functional module 340 to rotate around a first axis. In an optional implementation, the third driving mechanism 350 may be connected to the functional module 340 via a transmission mechanism. The third driving mechanism 350 can drive, via a first transmission mechanism, the functional module 340 to rotate, where the first transmission mechanism may be a chain transmission mechanism, a gear transmission mechanism, a belt transmission mechanism, or the like. The specific type of the first transmission mechanism is not limited in embodiments of this application.

The second bracket 330 is rotatably disposed on the first bracket 310, and the second driving mechanism 320 is disposed on the first bracket 310, such that the first bracket 310 can provide mounting positions for the second driving mechanism 320 and the second bracket 330. The second driving mechanism 320 is capable of driving the second bracket 330 to rotate around a second axis, and the functional module 340 is capable of rotating with the second bracket 330, where the first axis and the second axis intersect or lie on different planes. In this case, the functional module 340 can rotate around the first axis, and can also rotate around the second axis, allowing for more flexible anti-shake rotation of the functional module 340, thus implementing multi-directional anti-shake for the electronic device.

Similarly, the second bracket 330 may also be rotatably mounted on the first bracket 310 through rotatable engagement in a shaft hole or through a bearing. The second driving mechanism 320 may be fastened on the first bracket 310 through welding, bonding, connection using connectors (for example, screw connectors), and the like.

In this embodiment of this application, the functional module 340 includes an anti-shake micro-cloud gimbal 341 and a camera 342, the camera 342 being movably disposed on the anti-shake micro-cloud gimbal 341. The camera 342 is a shooting function device of the functional module 340, and the camera 342 is capable of rotating relative to the anti-shake micro-cloud gimbal 341, which can also implement anti-shake. It should be noted that the anti-shake micro-cloud gimbal 341 is typically configured with an electromagnetic driving mechanism, and such electromagnetic driving mechanism can drive the camera 342 to rotate so as to implement anti-shake rotation of the camera 342. This is a widely-known technology, and details are not described herein.

Rotation of the functional module 340 around the first axis allows the camera 342 to rotate around the first axis, and rotation of the functional module 340 around the second axis allows the camera 342 to rotate around the second axis.

During operation of the electronic device, when a user uses the functional module 340 of the electronic device, the first driving mechanism 200 can drive the movable module 300 to at least partially extend out of the housing 100 through the through hole 110, so that the functional module 340 extends out of the housing 100 through the through hole 110. In this case, the functional module 340 is not limited by the housing 100 and can be driven by the second driving mechanism 320 to rotate around the second axis and by the third driving mechanism 350 to rotate around the first axis, thereby implementing anti-shake rotation within a large angle range.

In this embodiment of this application, the electronic device has a first anti-shake state and a second anti-shake state, where in a case that the electronic device is in the first anti-shake state, at least one of the second driving mechanism 320 and the third driving mechanism 350 drives the functional module 340 to rotate. Specifically, in a feasible driving process, the third driving mechanism 350 stops operating, and the second driving mechanism 320 can drive the second bracket 330 to rotate around the second axis, which in turn drives the functional module 340 to also rotate around the second axis, so that the camera 342 can rotate around the second axis, thus finally implementing anti-shake in one direction by the camera 342 rotating around the second axis.

In another feasible driving process, the second driving mechanism 320 stops operating, and the third driving mechanism 350 drives the functional module 340 to rotate around the first axis, so that the camera 342 can rotate around the first axis, thus finally implementing anti-shake in another direction by the camera 342 rotating around the first axis.

In still another feasible driving process, the second driving mechanism 320 and the third driving mechanism 350 operate simultaneously, so that the camera 342 also rotates around the second axis while rotating around the first axis, thus implementing more dimensional rotation of the camera 342 for anti-shake.

In a case that the electronic device is in the second anti-shake state, the camera 342 is capable of rotating relative to the anti-shake micro-cloud gimbal 341, thereby implementing anti-shake through rotation relative to the anti-shake micro-cloud gimbal 341.

It should be noted that in this embodiment of this application, a rotation angle range of the functional module 340 rotating around the first axis or the second axis is a first angle range, that is, a rotation angle range of the camera 342 rotating around the first axis or the second axis is the first angle range.

A rotation angle range of the camera 342 rotating relative to the anti-shake micro-cloud gimbal 341 is a second angle range. The second angle range is smaller than the first angle range. For example, the first angle range of the camera 342 rotating around the first axis or the second axis may be 5°, and the second angle range of the camera 342 rotating relative to the anti-shake micro-cloud gimbal 341 may be 2°.

The electronic device disclosed in embodiments of this application incorporates improvements to the related technology such that the camera 342 extends out of the housing 100 and is driven by the second driving mechanism 320 and/or the third driving mechanism 350 to implement anti-shake within a large angle range, and the camera 342 can also implement anti-shake within a small angle range relative to the anti-shake micro-cloud gimbal 341. In this way, the electronic device can select a corresponding anti-shake state according to a shaking angle during shooting, which can improve the anti-shake effects.

In addition, in the electronic device disclosed in the embodiments of this application, during anti-shake rotation of the camera 342 around the first axis or the second axis, the camera 342 is not interfered with by other devices since it has extended out of the housing 100. This allows for large-angle anti-shake and avoids the problem of poor anti-shake effects caused by a small anti-shake compensation angle.

In an optional solution, the second axis may be an axis extending along a running direction of the through hole 110, and the second axis may be perpendicular to the first axis.

Optionally, the first axis and an optical axis of the camera 342 intersect or lie on different planes. Certainly, the first axis and the second axis may alternatively not be perpendicular to each other. For example, an included angle between the first axis and the second axis may be 30°, 45°, 60°, or the like.

In this embodiment of this application, the functional module 340 may further include a fill light assembly 343. The fill light assembly 343 may be fixedly connected to the anti-shake micro-cloud gimbal 341, and a fill light direction of the fill light assembly 343 is consistent with a shooting direction of the camera 342, so that the fill light assembly 343 can fill light for the camera 342, thus improving clarity of images shot by the camera 342 in a dark environment, and ultimately further improving shooting effects of the electronic device.

In this embodiment of this application, the third driving mechanism 350 and the fill light assembly 343 may be disposed on a first side of the second axis, and the anti-shake micro-cloud gimbal 341 and the camera 342 may be disposed on a second side of the second axis. Such layout can make structures and weights on two sides of the second axis more balanced, helping the functional module 340 rotate more stably around the second axis. In addition, such layout allows the functional module 340 to be made smaller in size along the second axis direction, which is conducive to reducing movement stroke of the movable module 300 driven by the first driving mechanism 200, thus providing more sufficient mounting space for other components in the electronic device.

In this embodiment of this application, the first driving mechanism 200 may be connected to the movable module 300 via a second transmission mechanism. Specifically, the second transmission mechanism may be a chain transmission mechanism, a gear transmission mechanism, a belt transmission mechanism, or the like. A specific type of the second transmission mechanism is not limited in this embodiment of this application.

In a more preferable solution, a base 400 may be provided in the housing 100, an elastic structural member 500 may be provided between the first bracket 310 and the base 400, the elastic structural member 500 may be connected to a first side edge of the first bracket 310, the first driving mechanism 200 may be connected to a second side edge of the first bracket 310, and the first side edge and the second side edge are two side edges of the first bracket 310 that face away from each other. During operation of the first driving mechanism 200, the first driving mechanism 200 drives the movable module 300 to move so as to make the elastic structural member 500 expand or contract, and the elastic structural member 500 serves as a buffer through its deformation to avoid great collision caused by excessively fast moving of the movable module 300. For example, in a process of the first driving mechanism 200 driving the movable module 300 to retract into the housing 100, the elastic structural member 500 may be compressed to deform so as to produce a buffering force opposite to the direction of retraction of the movable module 300. This prevents the movable module 300 from abruptly retracting into the housing 100, thus avoiding great collision and improving stability of retraction of the movable module 300. In a process of the first driving mechanism 200 driving the movable module 300 to extend out of the housing 100, the elastic structural member 500 is stretched, so as to prevent the movable module 300 from extending out of the housing 100 too fast.

In addition, the elastic structural member 500 and the first driving mechanism 200 are disposed at the first side edge and the second side edge respectively, which can make the force acting on the movable module 300 more balanced. This avoids the movable module 300 being subjected to large lateral force, facilitating more stable movement of the movable module 300.

In a further technical solution, the electronic device may further include a guide member 600. Specifically, the base 400 is fixedly disposed in the inner chamber of the housing 100, one end of the guide member 600 is fixedly connected to the base 400, a guide direction of the guide member 600 may be consistent with a running direction of the through hole 110, the other end of the guide member 600 is a free end, and the elastic structural member 500 is sleeved on the guide member 600. In this way, the elastic structural member 500 deforms in the guide direction of the guide member 600, allowing for more precise deformation of the elastic structural member 500, thus improving buffering effects of the elastic structural member 500.

In a still further technical solution, the first side edge of the first bracket 310 may be provided with a sleeve member 700. Specifically, the sleeve member 700 may be sleeved on the guide member 600, and the elastic structural member 500 is elastically located between the sleeve member 700 and the base 400. This allows the guide member 600 to be fixedly disposed between the base 400 and the first bracket 310, while avoiding the elastic structural member 500 being fixedly connected to the first bracket 310. This facilitates replacement of the elastic structural member 500 alone in case of damage to the elastic structural member 500, avoiding the problem of high maintenance costs caused by the need for maintenance personnel to replace the elastic structural member 500 and the first bracket 310 together.

In this embodiment of this application, a first circuit board 800 may be fastened in the housing 100, a second circuit board 900 may be provided on the first bracket 310, the second circuit board 900 is electrically connected to the first circuit board 800 via a first flexible electrical connector, and the first flexible electrical connector may be a flexible cable or a flexible circuit board. In an optional implementation, the guide member 600 may be a hollow guide rod. The first flexible electrical connector can pass through the hollow guide rod, thereby avoiding entanglement between the first flexible electrical connector and other components of the electronic device when the movable module 300 extends or retracts through the through hole 110.

Similarly, a rotating shaft 120 may be provided in the housing 100, and the second bracket 330 is rotatably engaged with the first bracket 310 via the rotating shaft 120. The rotating shaft 120 may be a hollow shaft with a central hole, and the third driving mechanism 350 and the functional module 340 may be electrically connected to the second circuit board 900 via a second flexible electrical connector that runs through the central hole. Optionally, the second flexible electrical connector may be a flexible circuit board or a flexible cable.

Specifically, the third driving mechanism 350 may be electrically connected to the second circuit board 900 via the second flexible electrical connector, and the second flexible electrical connector runs through the central hole, avoiding entanglement between the second flexible electrical connector and other components of the electronic device during rotation of the second bracket 330.

In this embodiment of this application, the third driving mechanism 350 is capable of driving the functional module 340 to switch between a first angle and a second angle. In a case that the functional module 340 is at the first angle, the functional module 340 faces toward a first direction, so that the camera 342 can shoot images in the first direction and the fill light assembly 343 can face toward the first direction to provide light to the environment, thereby improving clarity of the images shot by the camera 342 in the first direction.

In a case that the functional module 340 is at the second angle, the functional module 340 faces toward a second direction, so that the camera 342 can shoot images in the second direction and the fill light assembly 343 can provide light to the environment in the second direction, thereby improving clarity of the images shot by the camera 342 in the second direction. In addition, the first direction and the second direction may be opposite directions, thereby increasing the magnitude of the camera 342 rotating around the first axis, and expanding the shooting range of the camera 342. In this case, the functional module 340 enables the camera 342 to act as both a front-facing camera and a rear-facing camera, facilitating configuration of the electronic device with fewer cameras.

The electronic device disclosed in this embodiment of this application may be a mobile phone, a tablet computer, an e-book reader, a wearable device (for example, smart glasses and a smart watch), a game console, a medical device, or the like. A specific type of the electronic device is not limited in this embodiment of this application.

An embodiment of this application discloses a control method of electronic device, where the electronic device involved is the electronic device described in the foregoing embodiment, and the disclosed control method includes the following steps.

Step 101. Receive control information.

In this step, the electronic device can measure, using a measuring device (such as a gyroscope), a shaking angle of the electronic device during shooting, so as to generate control information based on the shaking angle. This process may be completed by a processor of the electronic device. Specifically, the electronic device may generate different control information according to magnitude of the shaking angle. In a case of large shaking angle, the electronic device generates first control information; and in a case of small shaking angle, the electronic device generates second control information.

Specifically, the magnitude of the shaking angle may be determined based on whether the shaking angle exceeds a preset threshold. For example, in a case that the shaking angle is larger than the preset threshold (for example, 4°), indicating a large shaking angle, the electronic device generates the first control information; and in a case that the shaking angle is less than the preset threshold, indicating a small shaking angle, the electronic device generates the second control information.

Step 102. In a case that the control information is first control information, control at least one of the second driving mechanism 320 and the third driving mechanism 350 to drive the functional module 340 to rotate.

In this step, in a case of large shaking angle, the second driving mechanism 320 and the third driving mechanism 350 can drive the functional module 340 to rotate, allowing the camera 342 to implement large-angle anti-shake around the first axis or the second axis.

Step 103. In a case that the control information is second control information, control the camera 342 to rotate relative to the anti-shake micro-cloud gimbal 341.

In this step, in a case of small shaking angle, the camera 342 can implement small-angle anti-shake range relative to the anti-shake micro-cloud gimbal.

In the process of a user shooting images with the camera 342, the electronic device can make, according to a shaking state of the electronic device, at least one of the second driving mechanism 320 and the third driving mechanism 350 drive the functional module 340 to rotate, or the electronic device can make, according to a shaking state of the electronic device, the camera 342 rotate relative to the anti-shake micro-cloud gimbal 341, thus implementing anti-shake within a large angle range and within a small angle range.

The electronic device disclosed in the embodiments of this application is capable of implementing the processes implemented in the control method in the foregoing method embodiment. To avoid repetition, details are not described herein again.

An embodiment of this application discloses a control apparatus of electronic device, where the electronic device involved is the electronic device described in the foregoing embodiment, and the disclosed control apparatus includes:

- a receiving module configured to receive control information;
- a first control module configured to, in a case that the control information is first control information, control at least one of the second driving mechanism 320 and the third driving mechanism 350 to drive the functional module 340 to rotate; and
- a second control module configured to, in a case that the control information is second control information, control the camera 342 to rotate relative to the anti-shake micro-cloud gimbal 341.

Since the control apparatus disclosed in this embodiment of this application embodiment corresponds to the control method described above, for corresponding information, reference may be made to the foregoing description of the control method. Details are not described herein again.

In the process of a user shooting images with the camera 342, the receiving module can receive control information of the electronic device in a shaking state. If the control information is first control information, the first control module controls at least one of the second driving mechanism 320 and the third driving mechanism 350 to drive the functional module 340 to rotate, so that the electronic device implements anti-shake in the first anti-shake state. If the control information is second control information, the second control module controls the camera 342 to rotate relative to the anti-shake micro-cloud gimbal 341 for anti-shake, so that the electronic device implements anti-shake in the second anti-shake state.

An embodiment of this application discloses a terminal device 1200 including a processor 1210, a memory 1209, and a program or instructions stored in the memory 1209 and capable of running on the processor 1210. When the program or instructions are executed by the processor 1210, the processes of any of the foregoing method embodiments are implemented, with the same technical effects achieved. To avoid repetition, details are not described herein again.

Figure 3:
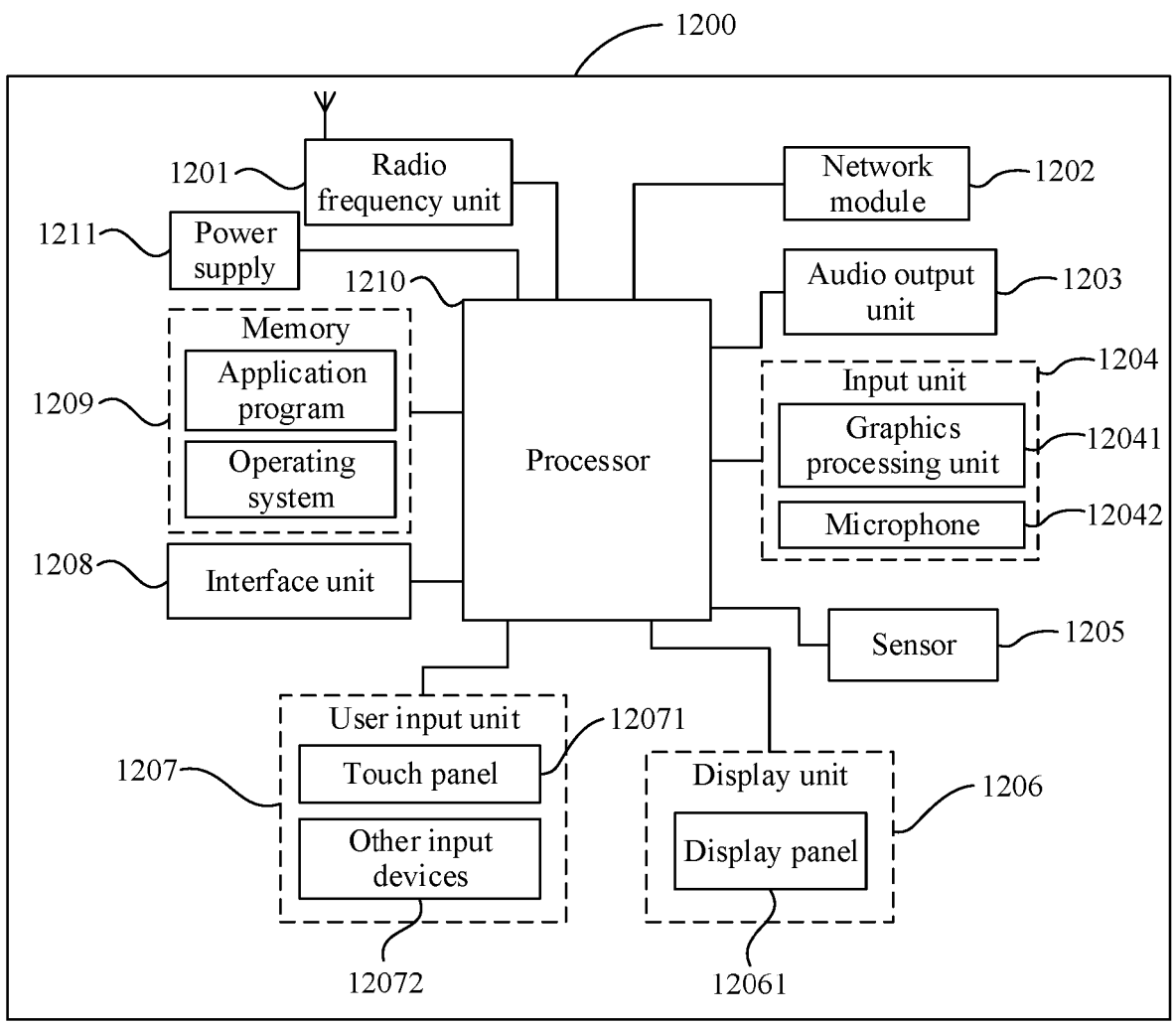
FIG. 3 is a schematic diagram of a terminal device.

FIG. 3 is a schematic diagram of a hardware structure of a terminal device 1200 for implementing the embodiments of this application.

An embodiment of this application discloses a readable storage medium, where the readable storage medium stores a program or instructions, and when the program or instructions are executed by a processor, the processes of any of the foregoing method embodiments are implemented, with the same technical effects achieved. To avoid repetition, details are not described herein again. The readable storage medium may be a read-only memory (ROM), a random access memory (RAM), a magnetic disk, an optical disc, or the like.

The terminal device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. Persons skilled in the art can understand that the structure of the terminal device 1200 shown in FIG. 3 does not constitute any limitation on the terminal device 1200. The terminal device 1200 may include more or fewer components than shown in the figure, or combine some components, or arrange the components differently.

The sensor 1205 is configured to measure a shaking angle of the electronic device during shooting, and the processor 1210 is configured to receive and differentiate control information. If the control information is first control information, the processor 1210 controls at least one of the second driving mechanism 320 and the third driving mechanism 350 to drive the functional module 340 to rotate; and if the control information is second control information, the processor 1210 controls the camera 342 to rotate relative to the anti-shake micro-cloud gimbal 341, thereby avoiding shaking caused by the user's difficulty in maintaining a stationary shooting posture while shooting images with the electronic device. This achieves anti-shake compensation and ultimately improves quality of images shot by a shooting apparatus.

It should be understood that in this embodiment of this application, the radio frequency unit 1201 may be configured to transmit and receive information, or to transmit and receive signals in a call process, and specifically, after receiving downlink data from a base station, transmit the downlink information to the processor 1210 for processing, and in addition, transmit uplink data to the base station. Generally, the radio frequency unit 1201 includes but is not limited to an antenna, at least one amplifier, a transceiver, a coupler, a low noise amplifier, and a duplexer. In addition, the radio frequency unit 1201 may further communicate with a network and other devices via a wireless communications system.

The terminal device 1200 provides a user with wireless broadband internet access by using the network module 1202, for example, helping the user to transmit and receive e-mails, browse web pages, and access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide audio output (for example, a call signal received sound or a message received sound) related to a specific function performed by the terminal device 1200. The audio output unit 1203 includes a speaker, a buzzer, a telephone receiver, and the like.

The input unit 1204 is configured to receive an audio or video signal. The input unit 1204 may include a graphics processing unit (GPU) 12041 and a microphone 12042. The graphics processing unit 12041 processes image data of a static picture or video that is obtained by an image capture apparatus (for example, a camera 342) in an image or video capture mode. A processed image frame may be displayed on the display unit 1206. An image frame processed by the graphics processing unit 12041 may be stored in the memory 1209 (or other storage media) or sent by the radio frequency unit 1201 or the network module 1202. The microphone 12042 can receive a sound and can process the sound into audio data. Under a telephone call mode, the processed audio data can be converted into a format that can be sent as an output to a mobile communication base station by the radio frequency unit 1201.

The terminal device 1200 further includes at least one sensor 1205, for example, an optical sensor, a motion sensor, and other sensors. Specifically, the optical sensor includes an ambient light sensor and a proximity sensor, where the ambient light sensor can adjust luminance of the display panel 12061 according to brightness of ambient light, and the proximity sensor can turn off the display panel 12061 and/or backlight when the terminal device 1200 is moved to an ear. As a type of motion sensor, an accelerometer sensor can detect magnitudes of accelerations in various directions (typically three axes), can detect the magnitude and direction of gravity when the mobile phone is in a static state, and can be used for posture recognition (such as screen switching between portrait and landscape, related games, and magnetometer posture calibration) of the terminal device 1200, functions related to vibration recognition (such as pedometer and tapping), and the like. The sensor 1205 may also include a fingerprint sensor, a pressure sensor, an iris sensor, a molecular sensor, a gyroscope, a barometer, a hygrometer, a thermometer, an infrared sensor, and the like. Details are not described herein.

The display unit 1206 is configured to display information input by the user or information provided to the user. The display unit 1206 may include a display panel 12061, and the display panel 12061 may be configured in a form of a liquid crystal display (LCD), an organic light-emitting diode (OLED) display, or the like.

The user input unit 1207 may be configured to receive input digit or character information and generate key signal input related to user setting and function control of the terminal device 1200. Specifically, the user input unit 1207 includes a touch panel 12071 and other input devices 12072. The touch panel 12071, also referred to as a touchscreen, may capture a touch operation performed by a user on or near the touch panel 12071 (for example, an operation performed by the user on the touch panel 12071 or near the touch panel 12071 by using any appropriate object or accessory such as a finger or a stylus). The touch panel 12071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information to point coordinates, and sends the point coordinates to the processor 1210, and receives and executes a command sent by the processor 1210. In addition, the touch panel 12071 may be implemented in a plurality of forms, for example, as a resistive, capacitive, infrared, or surface acoustic wave touch panel. The user input unit 1207 may further include other input devices 12072 in addition to the touch panel 12071. Specifically, the other input devices 12072 may include but are not limited to a physical keyboard, a function button (for example, a volume control button or a power on/off button), a trackball, a mouse, and a joystick. Details are not described herein.

Further, the touch panel 12071 may cover the display panel 12061. After detecting a touch operation on or near the touch panel 12071, the touch panel 12071 transmits information about the touch operation to the processor 1210 for the processor 1210 to determine a touch event type, and then the processor 1210 provides a corresponding visual output on the display panel 12061 based on the touch event type. Although in FIG. 3, the touch panel 12071 and the display panel 12061 act as two separate parts to implement input and output functions of the terminal device 1200, in some embodiments, the touch panel 12071 and the display panel 12061 may be integrated to implement the input and output functions of the terminal device 1200. This is not specifically limited herein.

The interface unit 1208 is an interface connecting an external apparatus to the terminal device 1200. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1208 may be configured to receive input (for example, data information and power) from an external apparatus and transmit the received input to one or more elements in the terminal device 1200 or may be configured to transmit data between the terminal device 1200 and the external apparatus.

The memory 1209 may be configured to store a software program and various data. The memory 1209 may mainly include a program storage area and a data storage area. The program storage area may store an operating system, an application program required for at least one function (for example, a sound play function and an image play function), and the like. The data storage area may store data created based on use of the electronic device (for example, audio data and a phone book), and the like. In addition, the memory 1209 may include a high-speed random access memory, or may further include a non-volatile memory, for example, at least one magnetic disk storage device, flash memory device, or another volatile solid-state storage device.

The processor 1210 is a control center of the terminal device 1200, and is connected to the components of the terminal device 1200 via various interfaces and lines. By running or executing software programs and/or modules stored in the memory 1209 and calling data stored in the memory 1209, the processor 1210 executes various functions of the terminal device 1200 and processes data so as to perform overall monitoring on the terminal device 1200. The processor 1210 may include one or more processing units. Optionally, the processor 1210 may integrate an application processor and a modem processor. The application processor mainly processes an operating system, a user interface, application programs, and the like. The modem processor mainly processes wireless communication. It can be understood that the modem processor may alternatively be not integrated in the processor 1210.

The terminal device 1200 may further include the power supply 1211 (for example, battery) supplying power to the components. Optionally, the power supply 1211 may be logically connected to the processor 1210 via a power management system, so that functions such as charge management, discharge management, and power consumption management are implemented by using the power management system.

In addition, the terminal device 1200 includes some functional modules that are not shown, details of which are not described herein.

The foregoing embodiments of this application focus on the differences between the embodiments. As long as the different features of improvement in the embodiments are not contradictory, they can be combined to form a more preferred embodiment. For brevity, details are not repeated herein.

The foregoing descriptions are merely embodiments of this application and are not intended to limit this application. For persons skilled in the art, this application may have various changes and variations. Any modification, equivalent replacement, improvement, or the like made without departing from the spirit and principle of this application shall fall within the protection scope of claims of this application.

What is claimed is:

1. An electronic device, comprising a housing, a first driving mechanism, and a movable module, wherein the housing has an inner chamber and a through hole communicating with the inner chamber, the first driving mechanism is disposed in the inner chamber, and the first driving mechanism is connected to the movable module and capable of driving the movable module to retract through the through hole into the housing or at least partially extend out of the housing; wherein the movable module comprises a first bracket, a second driving mechanism, a second bracket, a functional module, and a third driving mechanism, wherein the functional module is rotatably disposed on the second bracket, the third driving mechanism is disposed on the second bracket, the third driving mechanism is connected to the functional module and drives the functional module to rotate around a first axis, the second bracket is rotatably disposed on the first bracket, the second driving mechanism is disposed on the first bracket, the second driving mechanism drives the second bracket to rotate around a second axis, the functional module is capable of rotating with the second bracket, and the first axis and the second axis intersect or lie on different planes;

the functional module comprises an anti-shake micro-cloud gimbal and a camera, the camera being movably disposed on the anti-shake micro-cloud gimbal; and the electronic device has a first anti-shake state and a second anti-shake state, wherein in a case that the electronic device is in the first anti-shake state, at least one of the second driving mechanism or the third driving mechanism drives the functional module to rotate; and in a case that the electronic device is in the second anti-shake state, the camera is capable of rotating relative to the anti-shake micro-cloud gimbal;

wherein a base is provided in the housing, and an elastic structural member is provided between the first bracket and the base, wherein the elastic structural member is connected to a first side edge of the first bracket, the first driving mechanism is connected to a second side edge of the first bracket, and the first side edge and the second side edge are two side edges of the first bracket that face away from each other;

wherein the electronic device further comprises a guide member, wherein one end of the guide member is fixedly connected to the base, and the other end of the guide member is a free end; and the elastic structural member is sleeved on the guide member.

2. The electronic device according to claim 1, wherein the second axis is an axis extending along a running direction of the through hole, and the second axis is perpendicular to the first axis.

3. The electronic device according to claim 1, wherein the functional module further comprises a fill light assembly, wherein the fill light assembly is fixedly connected to the anti-shake micro-cloud gimbal, and a fill light direction of the fill light assembly is consistent with a shooting direction of the camera.

4. The electronic device according to claim 3, wherein the third driving mechanism and the fill light assembly are disposed on a first side of the second axis, and the anti-shake micro-cloud gimbal and the camera are disposed on a second side of the second axis.

5. The electronic device according to claim 1, wherein the first side edge of the first bracket is provided with a sleeve member, wherein the sleeve member is sleeved on the guide member, and the elastic structural member is elastically located between the sleeve member and the base.

6. The electronic device according to claim 1, wherein a first circuit board is fastened in the housing, a second circuit board is provided on the first bracket, the second circuit board is electrically connected to the first circuit board via a first flexible electrical connector, the second bracket is rotatably engaged with the first bracket via a rotating shaft, the rotating shaft is a hollow shaft with a central hole, and the third driving mechanism and the functional module are electrically connected to the second circuit board via a second flexible electrical connector that runs through the central hole.

7. The electronic device according to claim 1, wherein the third driving mechanism is capable of driving the functional module to switch between a first angle and a second angle; and in a case that the functional module is at the first angle, the functional module faces toward a first direction, and in a case that the functional module is at the second angle, the functional module faces toward a second direction; wherein the first direction and the second direction are opposite directions.

8. A control method of an electronic device, wherein the electronic device is the electronic device according to claim 1, and the control method comprises:

receiving control information;

in a case that the control information is first control information, controlling at least one of the second driving mechanism or the third driving mechanism to drive the functional module to rotate; and in a case that the control information is second control information, controlling the camera to rotate relative to the anti-shake micro-cloud gimbal.

9. The method according to claim 8, wherein the second axis is an axis extending along a running direction of the through hole, and the second axis is perpendicular to the first axis.

10. The method according to claim 8, wherein the functional module further comprises a fill light assembly, wherein the fill light assembly is fixedly connected to the anti-shake micro-cloud gimbal, and a fill light direction of the fill light assembly is consistent with a shooting direction of the camera.

11. The method according to claim 10, wherein the third driving mechanism and the fill light assembly are disposed on a first side of the second axis, and the anti-shake micro-cloud gimbal and the camera are disposed on a second side of the second axis.

12. The method according to claim 8, wherein the first side edge of the first bracket is provided with a sleeve member, wherein the sleeve member is sleeved on the guide member, and the elastic structural member is elastically located between the sleeve member and the base.

13. The method according to claim 8, wherein a first circuit board is fastened in the housing, a second circuit board is provided on the first bracket, the second circuit board is electrically connected to the first circuit board via a first flexible electrical connector, the second bracket is rotatably engaged with the first bracket via a rotating shaft, the rotating shaft is a hollow shaft with a central hole, and the third driving mechanism and the functional module are electrically connected to the second circuit board via a second flexible electrical connector that runs through the central hole.

14. The method according to claim 8, wherein the third driving mechanism is capable of driving the functional module to switch between a first angle and a second angle; and in a case that the functional module is at the first angle, the functional module faces toward a first direction, and in a case that the functional module is at the second angle, the functional module faces toward a second direction; wherein the first direction and the second direction are opposite directions.

15. A terminal device, comprising a processor, a memory, and a program or instructions stored in the memory and capable of running on the processor, wherein when the program or instructions are executed by the processor, the steps of the control method according to claim 8 are implemented.

16. A non-transitory readable storage medium, wherein the readable storage medium stores a program or instructions, and when the program or instructions are executed by a processor, the steps of the control method according to claim 8 are implemented.

* * * * *